United States Patent
Klaukien et al.

(10) Patent No.: US 8,424,804 B2
(45) Date of Patent: Apr. 23, 2013

(54) ATTACHMENT ARRANGEMENT FOR ATTACHING A COMPONENT TO THE FUSELAGE OF AN AIRCRAFT, AIRCRAFT AND METHOD FOR CONSTRUCTING AN ATTACHMENT ARRANGEMENT

(75) Inventors: Frank-Michael Klaukien, Ellerbek (DE); Uwe Johannsen, Steinkirchen (DE)

(73) Assignee: Airbus Operations GmbH, Hamburg ( * ) Notice: Subject to any disclaimer, the term of this patent is extended or adjusted under 35 U.S.C. 154(b) by 259 days.

(21) Appl. No.: 12/596,015

(22) PCT Filed: Apr. 21, 2008

(86) PCT No.: PCT/EP2008/054814
§ 371 (c)(1),
(2), (4) Date: Oct. 15, 2009

(87) PCT Pub. No.: WO2008/129038
PCT Pub. Date: Oct. 30, 2008

(65) Prior Publication Data
US 2010/0133381 A1    Jun. 3, 2010

Related U.S. Application Data

(60) Provisional application No. 60/926,047, filed on Apr. 24, 2007.

(30) Foreign Application Priority Data

Apr. 24, 2007   (DE) .......................... 10 2007 019 305

(51) Int. Cl.
*B64C 1/00*    (2006.01)
(52) U.S. Cl.
USPC ............................ 244/119; 244/120; 244/131

(58) Field of Classification Search .................. 244/131, 244/119, 120, 117 R, 118.1, 118.5, 118.6
See application file for complete search history.

(56) References Cited

U.S. PATENT DOCUMENTS

| | | | |
|---|---|---|---|
| 3,600,016 A | * | 8/1971 | Dilley .......................... 403/389 |
| 4,906,155 A | | 3/1990 | Balza |

(Continued)

FOREIGN PATENT DOCUMENTS

| | | |
|---|---|---|
| CN | 1930040 A | 3/2007 |
| DE | 19832441 C1 | 1/2000 |

(Continued)

OTHER PUBLICATIONS

Nui et al., Airframe Structural Design: Practical Design Information and Data on Aircraft Structures, Second Edition, Sep. 2006, p. 526-537, Hong Kong Conmilit Press Ltd., ISBN 962-7128-09-0.

*Primary Examiner* — Christopher P Ellis
*Assistant Examiner* — Medhat Badawi
(74) *Attorney, Agent, or Firm* — Lerner, David, Littenberg, Krumholz & Mentlik, LLP

(57) ABSTRACT

An attachment arrangement for attaching a component to the fuselage of an aircraft. The attachment arrangement comprises an elongated stringer that can be connected to the aircraft fuselage, and a fitting that can be connected to the component. The stringer comprises a multitude of recesses that are formed one behind the other in the direction of longitudinal extension of the stringer. The fitting comprises at least one engagement element that is adapted for positive-locking engagement in the recesses of the stringer. The stringer and/or the fitting can comprise CFC. The fittings can also comprise various other plastics or metal. Weight savings are achieved while at the same time providing stable and variably-positionable attachment. Furthermore, a method for constructing a stringer for an attachment arrangement is proposed, in which method, by providing reinforcement fibers adjacent to the recesses, a carbon scrim is locally reinforced around the recesses.

8 Claims, 5 Drawing Sheets

U.S. PATENT DOCUMENTS

| | | | |
|---|---|---|---|
| 5,893,534 A | 4/1999 | Watanabe | |
| 5,924,650 A * | 7/1999 | Richichi | 244/131 |
| 5,938,149 A * | 8/1999 | Terwesten | 244/118.5 |
| 6,105,902 A * | 8/2000 | Pettit | 244/119 |
| 6,173,925 B1 * | 1/2001 | Mueller et al. | 244/219 |
| 6,306,239 B1 | 10/2001 | Breuer et al. | |
| 6,883,753 B1 | 4/2005 | Scown | |
| 7,963,483 B2 * | 6/2011 | Roming et al. | 244/133 |
| 2005/0082431 A1 | 4/2005 | Scown et al. | |
| 2008/0197234 A1 * | 8/2008 | Wilhelm et al. | 244/118.6 |
| 2008/0302909 A1 * | 12/2008 | Chrissos et al. | 244/118.1 |
| 2010/0301164 A1 * | 12/2010 | Hudson | 244/118.6 |

FOREIGN PATENT DOCUMENTS

| | | |
|---|---|---|
| DE | 102005030997 B3 | 12/2006 |
| EP | 1612138 A1 | 1/2006 |
| GB | 631918 A | 11/1949 |
| WO | 2007003403 A1 | 1/2007 |

* cited by examiner

ATTACHMENT ARRANGEMENT FOR ATTACHING A COMPONENT TO THE FUSELAGE OF AN AIRCRAFT, AIRCRAFT AND METHOD FOR CONSTRUCTING AN ATTACHMENT ARRANGEMENT

CROSS-REFERENCE TO RELATED APPLICATIONS

This application is a national phase entry under 35 U.S.C. §371 of International Application No. PCT/EP2008/054814, filed Apr. 21, 2008, published in English, which claims the benefit of the filing date of German Patent Application No. 10 2007 019 305.1-22 filed Apr. 24, 2007 and of U.S. Provisional Patent Application No. 60/926,047 filed Apr. 24, 2007, the disclosure of which applications are hereby incorporated herein by reference.

FIELD OF THE INVENTION

The present invention relates to a flexible attachment arrangement for attaching a component to the fuselage of an aircraft, to an aircraft comprising such an attachment arrangement, and to a method for producing a stringer for such an attachment arrangement.

BACKGROUND TO THE INVENTION

In an aircraft, cabin components, for example trim components, hatracks or passenger seats, or entire cabin units, for example a toilet unit, have to be attached to the structural fuselage of the aircraft. Aircraft fuselages are often constructed by means of stringers and frame elements. In this design the stringers extend essentially in longitudinal direction of the aircraft fuselage, whereas the frame elements extend across the stringers. Conventionally, stringers and frame elements are made from metal, for example aluminium, and account for a considerable share of the overall weight of the aircraft. Furthermore, conventionally, cabin components are often attached to the frame elements and/or stringers by means of rivet connections or screw connections. For this purpose the frame elements/stringers are spot drilled in corresponding positions, and subsequently a fitting is attached in the borehole by means of a rivet or screw.

In particular in conditions as experienced in a crash landing, in which considerable acceleration forces (up to 9 g) can occur, components attached to the frame elements and stringers can exert very considerable forces in longitudinal direction on the structure of the fuselage. In order to be able to reliably withstand such forces, designated "x-loads", the attachment of cabin components in the x-direction, i.e. in longitudinal direction of the aircraft, must meet particularly stringent requirements.

There may thus be a requirement for an attachment arrangement for attaching a component to the fuselage of an aircraft, in which attachment arrangement in particular the above-mentioned disadvantages of conventional attachment arrangements can, at least in part, be avoided. In particular, there may be a requirement for a structurally stable lightweight attachment arrangement which makes it possible to attach cabin components of different sizes and of different weights in a positionally variable manner.

Furthermore, there may be a requirement for an aircraft comprising a corresponding attachment arrangement, and for a method for constructing such an attachment arrangement.

PRESENTATION OF THE INVENTION

This requirement can be met by the subject of the independent claims. Advantageous further developments of the invention are stated in the subordinate claims.

According to a first aspect of the present invention, an attachment arrangement for attaching a component to the fuselage of an aircraft is provided, wherein the attachment arrangement comprises an elongated stringer that can be connected to the aircraft fuselage, and a fitting that can be connected to the component. In this arrangement the stringer comprises a multitude of recesses that are formed one behind the other in the direction of longitudinal extension of the stringer. The fitting comprises at least one engagement element that is adapted for positive-locking engagement in the recesses of the stringer.

Features, characteristics, advantages and alternative embodiments of the invention are stated below.

In the present document the term "attachment arrangement" can refer to an arrangement that comprises at least two parts, wherein the first part, in the present document designated a "stringer", is adapted to be connected to an aircraft fuselage or to form part of the aircraft fuselage, while the other part, in this document designated a "fitting", is designed to be connected to a component that is to be affixed within the aircraft fuselage, for example a trim part, a stowage part, a seat or an entire cabin element, or is designed to form part of such a cabin element. The stringer and the fitting in turn are designed such that they can be firmly interconnected so that forces can be transmitted from the fitting, at least along one direction, preferably the x-direction of the aircraft fuselage, to the stringer. For this purpose the fitting comprises at least one engagement element whose form is adapted such that it can engage in a positive-locking manner a recess from among a multitude of recesses arranged one behind the other in the stringer.

In the simplest case a stringer can simply be an elongated flat component, similar to a piece of sheet metal, which on its opposite ends can be riveted, screwed, welded or in some other way attached, for example, to frame elements of the aircraft fuselage, which frame elements extend across the stringer. The stringer comprises recesses, preferably in the form of through-holes. By providing recesses, on the one hand the weight of the stringer can be considerably reduced. On the other hand, the recesses serve to accommodate one or several engagement elements on a fitting.

Since in the direction of longitudinal extension of the stringer several recesses are provided one behind the other, the fitting can be arranged so as to variably engage different recesses so that it can be attached at various positions on the stringer.

Furthermore, the recesses can already be incorporated at the time of manufacturing the stringer, so that there is no longer a need to provide (rivet-) holes in the stringer when components are installed in the aircraft fuselage at a later stage. The stringer can therefore also comprise materials such as, for example, fibre-reinforced plastics, in which subsequent spot drilling would result in considerable structural weakening.

According to one embodiment, the recesses in the stringer are arranged so as to be equidistant at a spacing s between adjacent recesses. The provision of recesses at the same spacing, one behind the other, can, on the one hand, simplify production of the stringer.

On the other hand, in a further embodiment, it can be provided for the fitting to comprise at least two engagement elements, wherein adjacent engagement elements are arranged with the spacing s between each other. If the recesses in the stringers are also formed so as to be equidistant at a spacing s, such a fitting can be arranged on the stringer as desired, in each case offset by the spacing s, wherein in each case the two engagement elements can engage adjacent recesses in the stringer. In this way better ways of transmitting forces from the fitting to the stringer can be achieved, while at the same time variable positioning of the fitting on the stringer at a pitch according to the spacing s can be obtained.

According to a further embodiment, the fitting further comprises a joining piece that is arranged so as to be spaced apart from a connecting line that connects the engagement elements of the fitting, such that a normal from the joining piece to the connecting line intersects the connecting line between two engagement elements. In other words, in the assembled state, the engagement elements can be situated on a line on the stringer, wherein the joining piece is laterally spaced apart from the stringer and is situated between the engagement elements (vertically projected onto the stringer). In this arrangement, the joining piece can, for example, be a simple hole or a stud in or on the fitting, to which hole or stud the component can be attached. Because the attachment element is located between the positions of the engagement elements, the component can also be fixed in such intermediate positions. Furthermore, with the use of several different fittings on which the joining pieces can be arranged at various positions, it is possible to achieve a further improvement in the flexibility relating to the positioning of the component to be attached.

According to a further embodiment, the recesses in the stringer are round. Such a round design of the recesses can result in good force transmission between the engagement elements of the fitting and the recesses in the stringer without there being any locally-concentrated force peaks. Furthermore, round recesses are easy to produce.

According to a further embodiment, the recesses have a cross-sectional area of at least 0.5 cm$^2$, preferably at least 1 cm$^2$, and more preferably at least 2 cm$^2$. In the case of round recesses a diameter of a recess should be at least 1 cm, preferably at least 2 cm. A larger cross-sectional area of the recess results in improved force transmission between the engagement element and the recess, thus reducing the risk of the face of the recess being subjected to wear, i.e. the risk of gradual widening of the recess due to the lateral force exerted by the engagement element.

According to a further embodiment, the stringer is designed as a T-stringer, wherein the recesses are arranged in the web of the T-stringer. T-stringers provide good mechanical stability and are often used in aircraft engineering. On the upper limb of the T-stringer it is possible, for example, to affix a trim panel of the aircraft fuselage. On the web of the T-stringer, which web protrudes in the middle from the upper limb, the recesses can be formed as a row of holes, preferably along the neutral fibre, i.e. where the tensile forces and compressive forces that bear on the stringer when the aircraft is in use essentially cancel each other out. The T-stringer can be a formed part made of a CFC-laminate.

According to a further embodiment, the fitting is designed as an injection moulded part. By means of injection moulding technology it is possible to produce structures in which highly filigree ribbing, that is matched to the flow of force, of the fittings or the stringers becomes possible, which would be too cost-intensive in the case of a milled part. Furthermore, walls as thin as approximately 0.5 mm can be realised, which results in additional potential for saving weight. With the use of injection moulding technology, fittings comprising high-technology thermoplasts such as PEI (polyether imide) with a 30% glass fibre content, and PEEK (polyetherether ketone).

As an alternative it is also possible to produce fittings as carbon-fibre-reinforced Duroplast mouldings.

According to a further embodiment, the fitting comprises glass-fibre-reinforced plastic. Such plastics are not only economical, they also provide sufficient strength to transmit light to medium forces.

According to a further embodiment, the fitting comprises a thermoformed carbon-fibre-reinforced plastic part. While such plastics are more expensive, they provide excellent strength that would seem to make them suitable also for transmitting very considerable forces.

According to a further embodiment, the fitting is a milled part or a carbon-fibre-reinforced Duroplast moulding part. In this way extremely good strength is achieved, which withstands even the greatest forces, for example as experienced in the attachment of entire cabin elements such as lavatory elements or galley elements.

A further aspect of the present invention provides for an aircraft with the attachment arrangement described above. In the aircraft, the stringer can form part of a load-bearing fuselage structure.

With the use of the attachment arrangement according to the invention, or of special embodiments of said attachment arrangements, the following results may be achieved in the aircraft. A flexible connection concept for x-fittings in order to accommodate x-loads on stringers can be implemented while at the same time weight and cost are reduced. In this arrangement, the recesses in the stringers should be selected to be large enough to fulfil an additional weight-saving potential. The fittings should assume a matching snug fit. Depending on the intended load, different fittings can be attached to the stringers, which fittings preferably use two to eight recesses in the stringer for the purpose of attachment. Since, by way of the engagement elements, the fitting engages the recesses of the stringer in a positive-locking manner, good permanently-stable force-transmission can result. No force transmission by way of friction is necessary, which force transmission might become less effective over time as a result of wear. Furthermore, surface pressure in the connection to the stringer is low because the force can be transmitted by means of the engagement elements that provide positive-locking engagement, without there being a possibility of jamming the stringer, which would lead to instances of high stress concentration. The use of injection-moulded and CFC-fittings further provides an advantage in that there is no risk of contact corrosion.

The fittings can also be formed using so-called snap-and-click engagement elements, which can removably snap into the recesses in the stringers. This provides quick exchange options or changeability of the position of the fitting on the stringer. Due to the multitude of recesses in the stringer, variable attachment points for the installation of components can be determined and can also be changed afterwards.

According to a further aspect of the present invention, a method for producing a stringer for an attachment arrangement comprising the following steps is proposed: providing a carbon scrim; making recesses in the carbon scrim; impregnating the carbon scrim; providing reinforcement fibres that are adjacent to the recesses; and pressing the carbon scrim together with the reinforcement fibres.

In the above method, for example, a mat or several mats comprising interwoven carbon fibres can be used as a carbon scrim. Recesses can be formed in the mat(s) by die-cutting. The carbon scrim can be impregnated with a resin that can be cured in a later process step. In order to mechanically reinforce the carbon scrim in the region of the recesses and in order to avoid subsequent pulling-out from the recesses when loads are experienced, reinforcement fibres can be arranged such that they are adjacent to the recesses. For example, reinforcement fibres that extend aslant; i.e. at an angle, in relation to the fibres of the carbon scrim can be placed onto the carbon scrim which comprises fibres that extend essentially at right angles to each other. These reinforcement fibres that extend aslant can be arranged so as to be wound around or wrapped around the recesses, thus reinforcing the edge of the recesses. Finally, the carbon scrim together with the reinforcement fibres can be pressed and in this process the resin can be cured at the same time. A matrix and a corresponding die can be used for pressing, with both the matrix and the die preferably being able to be heated and pressurised.

The characteristics stated above with reference to individual embodiments of the present invention can be combined as desired. In particular, features described in the context of the attachment arrangement can be combined with features of the aircraft or of the construction method according to the invention.

The above-described and further aspects, features, and advantages of the present invention are set out in the following description of specific embodiments with reference to the enclosed drawings.

BRIEF DESCRIPTION OF THE DRAWINGS

In each case the drawings are only schematic diagrams. Identical or similar reference characters in the drawings designate identical or similar elements.

FIG. 1 shows an attachment arrangement 1, which joins part of an aircraft fuselage 3 that comprises a stringer 5 and a frame element 7. The stringer 5 extends in longitudinal direction of the aircraft fuselage 3 and is designed as a T-stringer.

Figure 1:
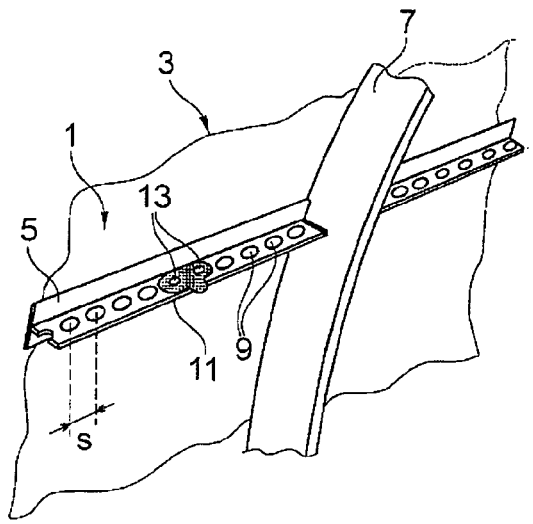
FIG. 1 shows a perspective view of an attachment arrangement according to a first embodiment of the present invention.

The stringer comprises several round recesses 9, arranged one behind the other, which are arranged approximately in the middle of the web of the T-stringer and thus approximately in the force-neutral fibre of the stringer.

On the stringer 5 a fitting 11 is attached. The fitting 11 comprises two engagement elements 13 that are round and that engage said reccesses 9, which recesses 9 are also round, in a positive-locking manner.

Figure 2:
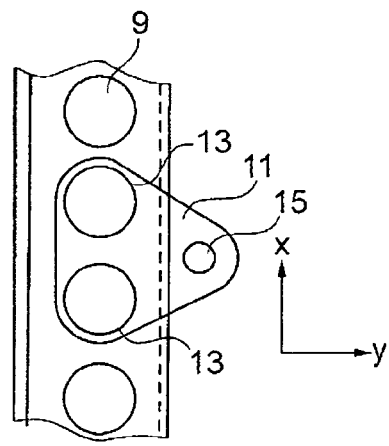
FIG. 2 shows a top view of the attachment device shown in FIG. 1.

As shown in FIG. 2, the fitting 11 is essentially triangular in shape, wherein on the "corner" of the triangle, which corner is spaced apart from the stringer, a joining piece 15 is provided. In the embodiment shown, the joining piece 15 is a simple round hole on which a component (not shown) can be attached. The engagement elements 13 comprise a slightly smaller diameter than do the recesses 9 in the stringer, so that in the assembled state said engagement elements 13 can engage the recesses in a positive-locking manner.

In the stringer, the recesses 9 are arranged so as to be equidistant, at a spacing s. Since the spacing between the engagement elements of the fitting 11 also corresponds to the spacing s, the fitting can be attached to any desired adjacent recesses along the stringer 5, which in turn results in variable positioning of a component that can be affixed to the fitting 11.

The attachment arrangement shown in FIGS. 1 and 2 is provided to accommodate minor forces, for example as exerted by attached trim components, insulation material, decompression panels and linear lighting covers. In these applications the forces exerted in the x-direction are, as a rule, less than 200 daN (decanewton), while forces in the y-direction are, as a rule, less than 60 daN.

Figure 3:
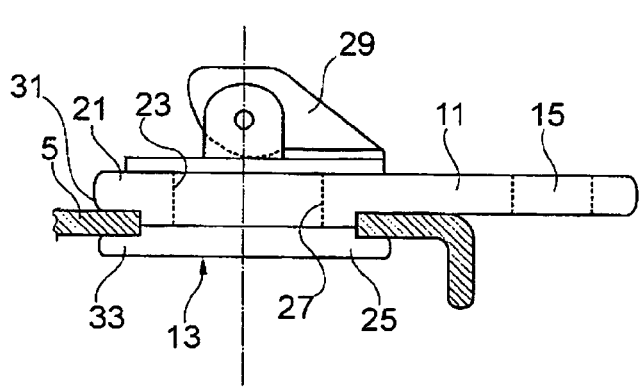
FIG. 3 shows a section view of an attachment arrangement according to a further embodiment of the present invention comprising a snap-and-click mechanism.

The stringer 5 can also comprise metal into which recesses 9 have been incorporated. However, in order to save weight, and in order to harmonise the use of materials in CFC-fuselages, the use of plastic stringers produced in CFC-laminate construction is preferred. The 2-hole fitting can be produced from injection-moulded plastic, for example PEI (polyether imide) with a 30% glass-fibre content (short fibres). It is also possible to use a higher-grade injection-moulded thermoplast, for example comprising PEEK (polyetheretherketone) with a 40% content of carbon fibres with short fibres or long fibres FIG. 3 shows a snap-and-click fitting for attaching a component in the xy-direction. The engagement element 13 of the fitting 11 is designed in two parts, wherein the upper part 21 of the engagement element 13 comprises a hole 23. The lower part 25 of the engagement element 13 comprises a stud 27 that can reach through the hole 23 of the upper part 21, with a locking element 29 that can be folded over being attached to the end of said stud 27. In each case the upper part 21 and the lower part 25 have a projection 31, 33, which in the installed state of the fitting rest against the stringer 5 from above and from below.

Figure 4:
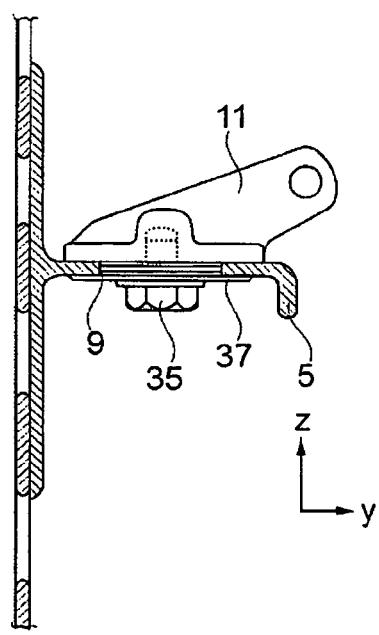
FIG. 4 shows a lateral view of an attachment arrangement according to a further embodiment of the present invention comprising a screw connection.

FIG. 4 shows a further fitting 11, which to a limited extent is also suitable for absorbing forces that act in the z-direction and that are preferably less than 60 daN. The fitting 11 is attached to the recess of the T-stringer 5 with the use of a screw 35 and a washer 37.

Figure 5:
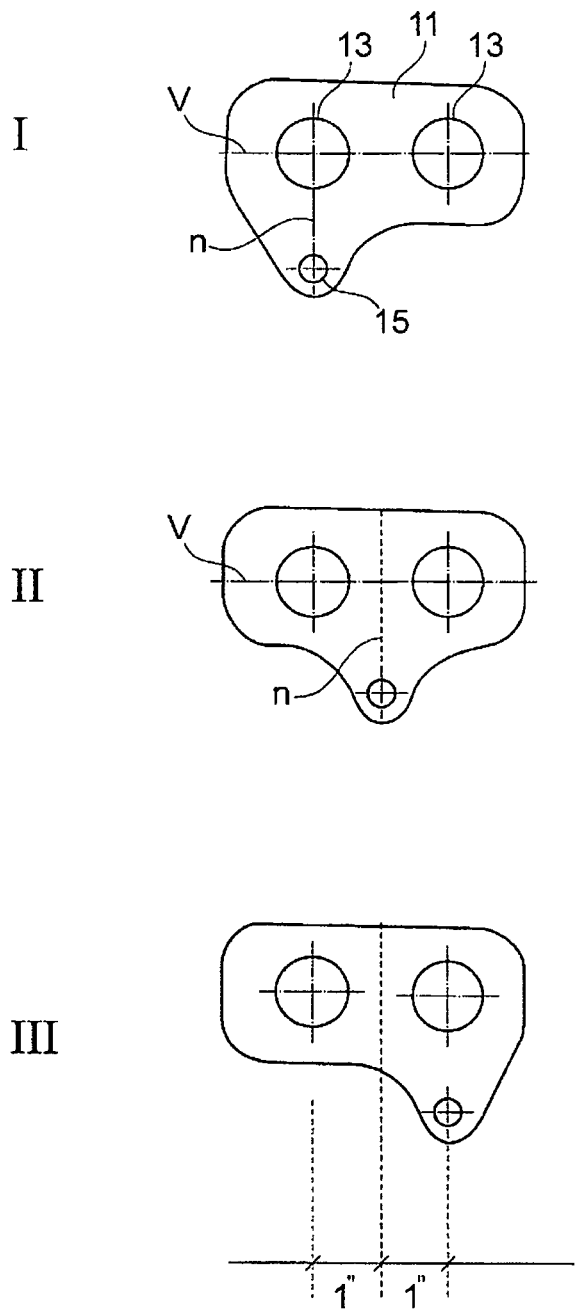
FIG. 5 shows various exemplary embodiments of fittings for an attachment arrangement according to further embodiments of the present invention.

FIG. 5 shows various fittings in which the joining piece 15 is located at various positions in relation to the engagement elements 13. In the example shown in FIG. 5 I a normal n through the joining piece 15 to the connection line v intersects the connecting line v between the two engagement elements 13 in the centre of the (left-hand side) engagement element 13. In the example shown in FIG. 5 II the normal n intersects the connecting line v in the middle between two engagement elements 13. In the example shown in FIG. 5 III the fitting shown in FIG. 5 I is shown in a position rotated by 180°.

The two fittings shown make it possible for a component to be attached to be able to be positioned at a pitch that corresponds to half the distance between two recesses 9 in the stringer 5. In practical application it is possible, for example, to provide round recesses with a diameter of one inch, which are, however, offset in relation to each other by two inches. By providing the two different fittings, positioning of the component to be attached can be achieved at an accuracy of one inch.

Figure 6:
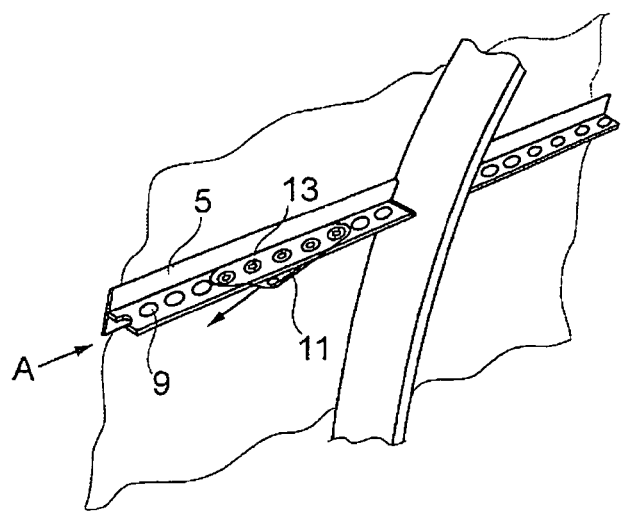
FIG. 6 shows a perspective view of an attachment arrangement according to a further embodiment of the present invention, designed for medium loads.

FIG. 6 shows an embodiment of the attachment arrangement that is designed to absorb medium forces, such as can be caused, for example, by a supply channel (PSU channel) or a hatrack arranged above the passenger seats. In this arrangement the fitting 11 comprises five engagement elements 13 which in a positive locking manner engage corresponding recesses 9 in the T-stringer 5. The fitting can, for example, be made from a thermoplast injection-moulding material. For example PEEK (polyetheretherketone) with a content of long carbon fibres of, for example, 40%, precision cast aluminium, a carbon-fibre-reinforced moulded plastic part, or combinations thereof can be used. The attachment arrangement is designed for forces in x-direction of up to 500 daN and for forces in y-direction of up to 150 daN.

Figure 7:
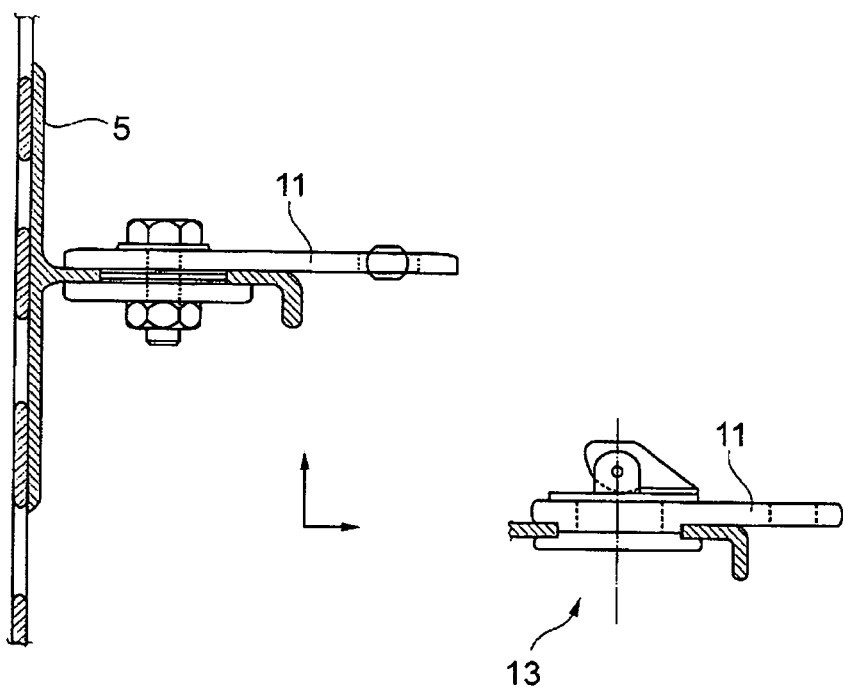
FIG. 7 shows two lateral views of alternative embodiments of the attachment arrangement shown in FIG. 6.

FIG. 7 shows alternative embodiments of the attachment arrangement shown in FIG. 6 with a screw connection or a snap-and-click connection, similar to those shown in FIGS. 3 and 4.

Figure 8:
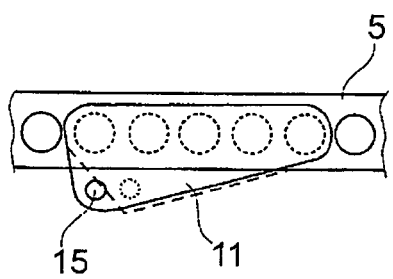
FIG. 8 shows alternative exemplary embodiments of fittings for the attachment arrangement shown in FIG. 6.

FIG. 8 shows alternative variants of fittings 11 for the attachment arrangement shown in FIG. 6, by means of which fittings 11 an inch-by-inch installation of components is possible, similar to the installation of the system shown in FIG. 5.

FIGS. 9 to 12 shows alternative embodiments of an attachment arrangement, which embodiments are designed to absorb very considerable loads, such as can be encountered, for example, in the attachment of stowages, galleys, crew rest compartments or lavatories. In this case the fittings comprise seven or eight engagement elements 13 that in a positive-locking manner engage corresponding recesses 9 in the stringer.

Figures 9, 10:
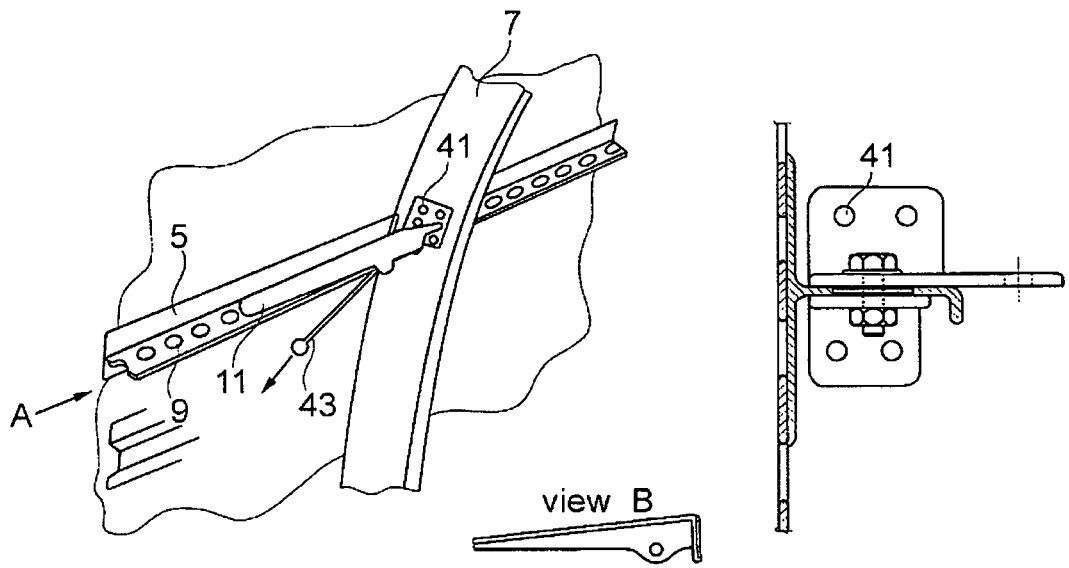
FIG. 9 is a perspective view of an attachment arrangement according to a further embodiment of the present invention, designed for very considerable loads.
FIG. 10 is a lateral view of the attachment arrangement shown in FIG. 9.
Figure 11:
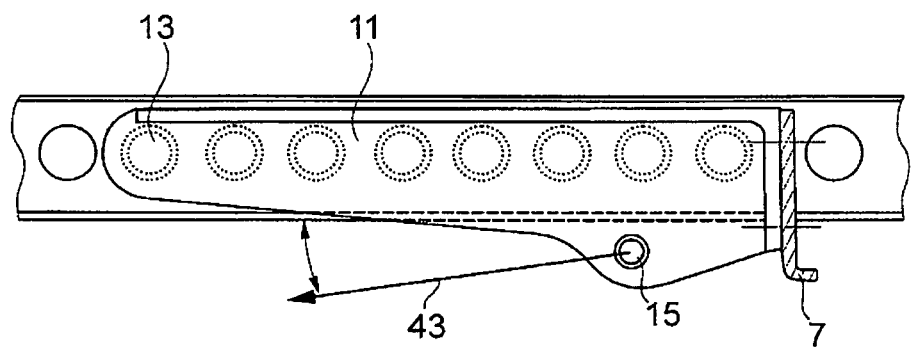
FIG. 11 is a top view of the attachment arrangement shown in FIG. 9.

As shown in FIGS. 9 to 11, to provide additional stability, the fitting 11 can also rest against a frame element 7 and can be attached to said frame element 7 by means of screws or rivets 41. In order to transmit forces between a component to be attached and the fitting 11, a joint rod 43, which is attached in the joining piece 15, can be used.

Figure 12:
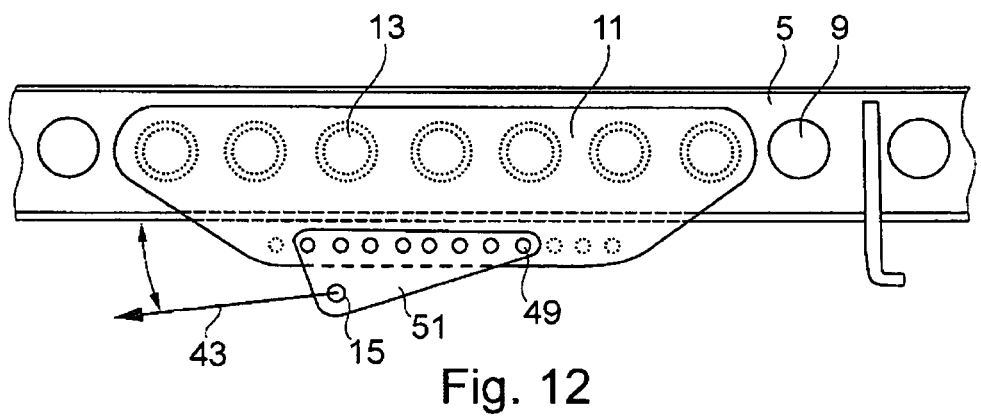
FIG. 12 is a top view of an attachment arrangement according to a further embodiment of the present invention, designed to absorb very considerable loads.

As shown in FIG. 12, the fitting 11 can also be held, so as to provide engagement, in several adjacent recesses 9 without the support of the frame element 7, and in this way can transmit very considerable forces onto the stringer.

In order to allow inch-by-inch installation or still more finely-adjustable positioning of components to be attached, an additional mounted part 51 can be provided which is attached in a multitude of holes 49, arranged one behind the other, in the fitting 11.

Figure 13:
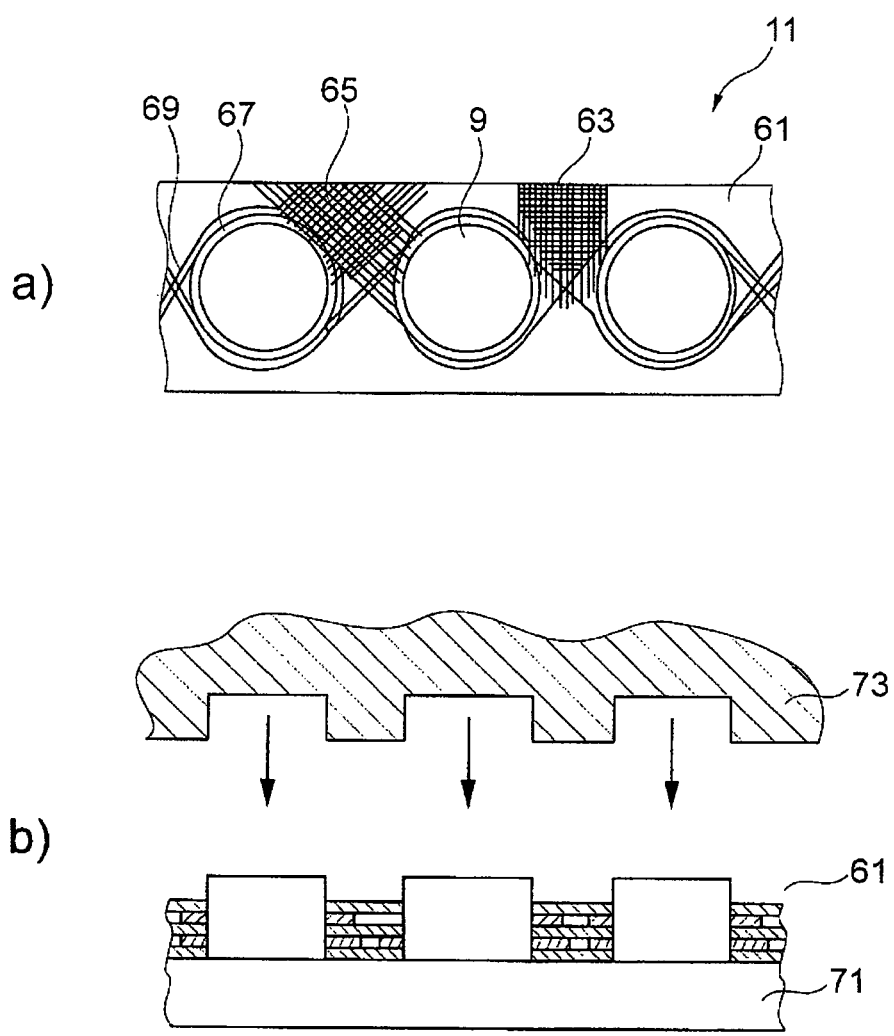
FIG. 13 serves to explain a manufacturing method for an attachment arrangement according to a further embodiment of the present invention.

With reference to FIG. 13, a construction method for the production of a stringer for an attachment device can be explained. In order to save weight, the stringer is preferably made from fibre-reinforced plastic. Since, in the case of such plastics, any die-cutting of recesses can result in considerable weakening of the material in this region, the regions around the recesses should be reinforced in a targeted manner.

FIG. 13 (a) shows a carbon scrim 61. The carbon scrim 61 comprises several carbon-fibre mats 63, 65, wherein each mat comprises fibres that are interwoven perpendicularly in relation to each other, and wherein carbon-fibre mats 63, 65, one placed on top of the other, that are offset by 45° in relation to each other, can be arranged.

In the carbon-fibre scrim 61, recesses 9 can be formed by die-cutting. The edges 67 around the recesses 9 are reinforced by adjacent reinforcement fibres 69. These reinforcement fibres 69 are wound or wrapped around the recesses 9, thus resulting in an additional reinforcing material layer around the recesses 9.

After the carbon scrim 61 and any reinforcement fibres 69 that might have been placed thereon have been pre-impregnated with a resin, they are placed into a press with a die 71 and a matching matrix 73, and in this press they are pressed and cured under pressure and by exposure to heat.

Finally, it should be pointed out that the terms "comprising", "having" etc. do not exclude the presence of further elements. The term "a" or "one" does not exclude a plural number of objects. The reference characters in the claims are only provided for ease of reading; they are not intended to limit the scope of protection of the claims in any way.

LIST OF REFERENCE CHARACTERS

1 Attachment arrangement
3 Aircraft fuselage
5 Stringer
7 Frame element
9 Recess
11 Fitting
13 Engagement element
15 Joining piece
21 Upper part of the fitting
23 Hole
25 Lower part of the fitting
27 Stud
29 Locking element
31, 33 Projection
35 Screw
37 Washer
41 Screw
43 Joint rod
49 Hole
51 Mounted part
61 Carbon scrim
63, 65 Carbon-fibre mat
67 Reinforcement fibre
71 Die
73 Matrix

The invention claimed is:

1. An attachment arrangement for attaching a component to a fuselage of an aircraft comprising stringers and frame elements, wherein the attachment arrangement comprises:
    an elongated stringer configured to be a part of the aircraft fuselage; and
    a fitting configured to be connected to the component;
    wherein the stringer comprises one of glass-fiber-reinforced plastic and carbon-fiber-reinforced plastic;
    wherein the stringer comprises more than two recesses formed one behind the other in the direction of longitudinal extension of the stringer;
    wherein the fitting comprises at least one engagement element configured for positive-locking engagement in the recesses of the stringer, and
    wherein the recesses in the stringer are arranged between neighboring frame elements so as to be equidistant at a spacing s between adjacent recesses.

2. The attachment arrangement of claim 1, wherein the fitting comprises at least two engagement elements, and wherein adjacent engagement elements are spaced with the spacing s between each other.

3. The attachment arrangement of claim 2, wherein the fitting further comprises a joining piece that is arranged so as to be spaced apart from a connecting line (v) that connects the engagement elements, such that a normal (n) from the joining piece to the connecting line intersects the connecting line between two engagement elements.

4. The attachment arrangement of claim 1, wherein the recesses are round.

5. The attachment arrangement of claim 1, wherein the recesses have a cross-sectional area of at least 1 cm$^2$.

6. The attachment arrangement of claim 1, wherein the stringer is configured as a T-stringer, and wherein the recesses are arranged in the web of the T-stringer.

7. An aircraft comprising an attachment arrangement for attaching a component to a fuselage of the aircraft, wherein the attachment arrangement comprises:

an elongated stringer configured to be a part of the aircraft fuselage;

a fitting configured to be connected to the component;

wherein the stringer comprises one of the glass-fiber-reinforced plastic and carbon-fiber-reinforced plastic;

wherein the stringer comprises more than two recesses formed one behind the other in the direction of longitudinal extension of the stringer;

wherein the fitting comprises at least one engagement element configured for positive-locking engagement in the recesses of the stringer, and wherein the recesses in the stringer are arranged between neighboring frame elements so as to be equidistant at a spacing s between adjacent recesses.

8. The aircraft of claim 7, wherein the stringer is part of a load-bearing fuselage structure.

* * * * *

UNITED STATES PATENT AND TRADEMARK OFFICE
CERTIFICATE OF CORRECTION

PATENT NO. : 8,424,804 B2
APPLICATION NO. : 12/596015
DATED : April 23, 2013
INVENTOR(S) : Frank-Michael Klaukien and Uwe Johannsen It is certified that error appears in the above-identified patent and that said Letters Patent is hereby corrected as shown below:

In the claims
Column 10, line 5, after "of" delete "the".

Signed and Sealed this
First Day of March, 2016

Michelle K. Lee
*Director of the United States Patent and Trademark Office*